J. CLASS.
SAW.
No. 11,246. Reissued June 21, 1892.
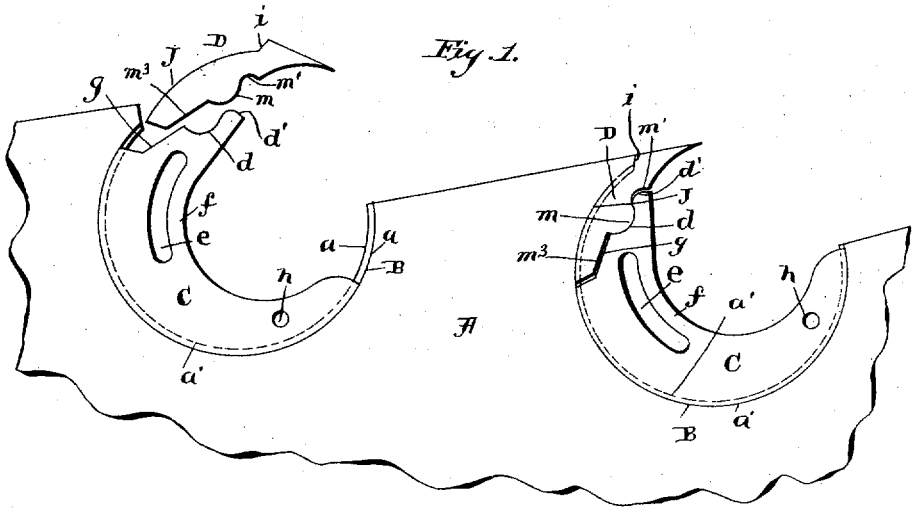
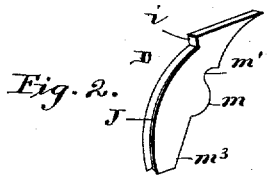
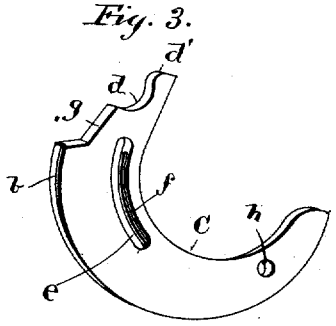
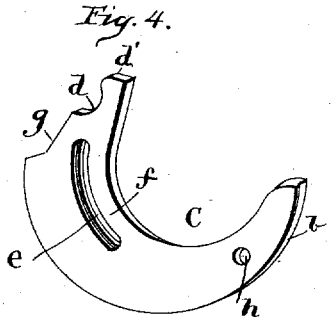
WITNESSES—
Geo. E. Fuchs
Rob't F. Fitzgerald
INVENTOR—
John Class
per
Lehmann Pattison & Nesbit
Attys
THE NORRIS PETERS CO., PHOTO-LITHO., WASHINGTON, D. C.

UNITED STATES PATENT OFFICE.

JOHN CLASS, OF CANTON, OHIO.

SAW.

SPECIFICATION forming part of Reissued Letters Patent No. 11,246, dated June 21, 1892.

Original No. 459,477, dated September 15, 1891. Application for reissue filed February 26, 1892. Serial No. 422,941.

*To all whom it may concern:*

Be it known that I, JOHN CLASS, a citizen of the United States, and a resident of Canton, in the county of Stark and State of Ohio, have invented a new and useful Improvement in Saws, of which the following is a full, clear, and exact description, reference being had to the accompanying drawings, making a part of this specification.

My invention relates to improvements in saws; and it consists in certain features of construction and combination of parts, as will be hereinafter described, and pointed out in the claims.

The object of my invention is to provide a spring-holder for insertible saw-teeth that is constructed to have both ends of the spring rigidly connected, the point of connection nearest the insertible tooth serving, primarily, as a fulcrum, and, secondarily, as an auxiliary spring, whereby the strain exerted by the tooth upon the holder is toward the center of the saw in contradistinction to being in the direction of the circumference thereof, which prevents the tendency to expansion of the rim of the saw and overcomes a serious objection to the ordinary spring-holder, and also holds the tooth more perfectly and yieldingly in position.

Figure 1 of the accompanying drawings is a side elevation of a fragment of a saw illustrating my invention. Fig. 2 is a view in perspective of an insertible saw-tooth. Fig. 3 is a similar view of the tooth-holding shank from side and rear. Fig. 4 is a similar view of the tooth-holding shank from side and front.

Similar letters of reference indicate corresponding parts in all of the figures of the drawings.

A represents a section of a saw-plate having in its rim circular sockets B, the edge of the sockets to be V-shaped, as shown at $a$ and by the dotted line $a'$.

The tooth-holding shank C is of the form shown in the figures of the drawings, having an outer diameter to correspond with the circle of the sockets B, the outer edge of which is provided with a V-shaped groove $b$ to correspond with the V-shaped edge of the circle in the saw-plate, and is shouldered or cut away, as shown, to form an inclined edge $g$.

The shank or holder C is provided with an elongated opening $e$, near the end which engages the insertible tooth, which forms a spring-brace $f$, the upper end of which projects above the aperture $e$, and is provided with a recess $d$ and rounded extremity $d'$. This construction forms, practically, a spring having both ends connected with the holder, the upper extremity projecting above its upper connecting-point, as shown. The portion $g$ forms, primarily, a fulcrum for the spring portion $f$ and, secondarily, a spring. By connecting the upper end of the spring $f$, as shown, the strain exerted upon the holder by the inserted tooth is toward the center of the saw instead of in the direction of the circumference thereof, which latter tends to expand the rim of the saw, which is very objectionable, as will be readily understood.

The insertible tooth D is provided in form substantially as shown in Fig. 2, having a shoulder $i$, a circular portion J to correspond with the circle of the socket B, a V-shaped groove to correspond with the V of the face of the circle B, an inclined portion $m^3$, a recess $m'$, and a circular projection $m$ to correspond with the circular recess $d$ in the shank C. While I here show the tooth D provided with a shoulder $i$ at its upper end, I do not limit myself to this construction, for this element and construction are old in prior patents, and also for the reason that a stop may be provided for the tooth in many ways, or for the holding-shank, without affecting my invention in any manner, which relates, broadly, to the construction of the holder whereby a spring is formed at the inner side thereof that is connected at both ends to the holder, as and for the purposes hereinbefore specified.

In operation the shank B is turned out, as shown at the left-hand end of Fig. 1, the tooth passed in the circular socket to rest in the recess, the pins of the wrench placed in the perforation $h$ and in the upper end portion of the aperture $e$, and the shank turned into the socket to carry the tooth into the recess, as shown at the right-hand end of Fig. 1. The advantage of this form of structure is that all the elasticity required is provided by the yielding or bending inwardly of the brace $f$ and the wall of the inclined edge $g$ of the shank. The circular projection $m$ of the tooth, resting in the depression $d$, and the rounded projection of the shank C, resting in the recess $m'$ of the tooth, will permit the tooth to rock, so as to allow the full length of the circular back J of the tooth to adjust itself to the face of the socket B, the front of the tooth being supported entirely on the projection $m$, resting and turning in the recess $d$. By this form of construction a stronger tooth, as well as a stronger shank, is formed and tangential flight of either the tooth or shank prevented.

Having thus described the nature and object of my invention, what I claim as new, and desire to secure by Letters Patent, is—

1. The combination, with a saw-plate having a socket, of an insertible tooth, a tooth-holding shank having an elongated opening in the portion adjacent to the said tooth forming the spring portions $f$ and $g$, and a stop for holding the tooth against inward movement, substantially as set forth.

2. The combination, with a saw-plate having a socket, of an insertible tooth, and a holder having the end thereof adjacent to the said tooth inclined from its outer edge inward, and an opening adjacent to the said incline and to its inner edge to form a spring-brace at its inner edge and a yielding connection therefor at its upper end.

3. The combination, with a saw-plate having a socket, of an insertible tooth, and a holder fitting in the socket, having an elongated opening with closed ends adjacent to its inner edge and to the tooth, whereby a spring-brace is formed with a yielding connection at its upper end, and a stop for the tooth, substantially as specified.

4. The combination, with a saw-plate having a socket, of an insertible tooth having a shoulder at its upper end, and a tooth-holding shank having an elongated opening in the portion adjacent to the tooth, forming the spring portions $f$ and $g$, substantially as set forth.

5. The combination, with a saw-plate having a circular socket, of an insertible tooth having a shoulder $i$ at its upper rear portion, a circular projection $m$, an inclined edge $m^3$, and a recess $m'$ at its front edge, a tooth-holding shank having a circular depression $d$ to take the projection $m$, a rounded projection $d'$ to fit the recess $m'$, an inclined edge $g$, and an elongated opening in the portion adjacent to the tooth forming the spring portions $f$ and $g$, substantially as set forth.

In testimony whereof I hereunto set my hand this 13th day of February, 1892.

JOHN CLASS.

Witnesses:

CALVIN SIEMANN,
JOHN SUMMERS.